United States Patent [19]

Kleinman

[11] 3,821,539

[45] June 28, 1974

[54] SIMULATED TELEPHONE FLASHLIGHT

[76] Inventor: Joseph Kleinman, 8504 16th St., Silver Spring, Md. 20910

[22] Filed: Mar. 2, 1973

[21] Appl. No.: 337,672

[52] U.S. Cl......... 240/6.45 R, 240/2.17, 240/10.6 R
[51] Int. Cl............................................. A45c 15/06
[58] Field of Search......... 240/2 R, 2.17, 4.2, 6.4 R, 240/6.45 R, 10.5, 10.6 R

[56] References Cited

UNITED STATES PATENTS

| | | | |
|---|---|---|---|
| 2,120,238 | 6/1938 | Brush | 240/4.2 X |
| 2,298,207 | 10/1942 | Gent | 240/2.17 UX |
| 3,118,614 | 1/1964 | Mosca | 240/2.17 |

FOREIGN PATENTS OR APPLICATIONS

| | | | |
|---|---|---|---|
| 1,957,678 | 5/1971 | Germany | 240/2.17 |

*Primary Examiner*—Fred L. Braun

[57] ABSTRACT

A flashlight in the form of a simulated telephone handset. A lamp bulb and reflector are mounted in the earpiece and a mirror is mounted in the mouthpiece, or vice versa. The mirror and lamp are at an angle to each other such that the axis of the beam of light emanating from the earpiece intersects the axis of the mirror at a finite location from the handset. This relationship permits the use of the flashlight as a mirror with an illuminated field of view for applying cosmetics. The handset has a coiled cord and a receiver to which the cord is connected. In one embodiment a battery is mounted within the handgrip portion of the handset and the cord is removable to permit use of the flashlight outside the automobile. In another embodiment the cord contains wires and terminates at a plug adapted to be plugged into the cigarrette lighter socket of an automobile. A simulated telephone receiver adapted to be mounted on the dashboard of an automobile has a hanger to hang the handset when not in use as a flashlight. The handset can have a safety switch which overrides a manual switch and deenergizes the lamp bulb automatically when the handset is placed on its hanger.

9 Claims, 4 Drawing Figures

SIMULATED TELEPHONE FLASHLIGHT

BACKGROUND OF THE INVENTION

This invention relates to a novelty flashlight in the form of a simulated telephone handset in which a beam of light from the flashlight emanates from the earpiece of the telephone, and a mirror can be mounted in the mouthpiece of the simulated telephone so the user can use the flashlight as a cosmetic mirror, if desired.

Flashlights and lamps of many different types have been combined with working telephones to illuminate for example, the telephone dial or an area adjacent to the telephone which is used for writing or note taking. Some of these lamp and flashlight arrangements include flashlights of the penlight type adapted to be clipped or otherwise connected to either the handset or base of the telephone. Shields of various types can also be provided to direct the light in a desired direction and prevent the light from illuminating other than desired areas.

Cosmetic mirrors in which a lamp or lamps are arranged so the area illuminated by the lamps is visible in the mirror are also known for the purpose of assisting the application of cosmetics such as lipstick or powder. In such prior arrangements the mirror is of the hand held type and the lamp or flashlight illuminates a desired area of the user such that the illuminated area is visible in the mirror.

Young adults and others will find it fashionable and prestigious to have simulated telephones located in their automobiles, for example, below the dashboard, and these telephones simulate an operating telephone even though the units merely consist of a handset connected by a dummy cord to some structure of the automobile. The handset, of course, has no connecting radio or telephone equipment and is used merely to cause observers to think that the automobile in question is in fact equipped with an operating telephone.

SUMMARY OF THE INVENTION

In accordance with this invention a flashlight is provided which simulates an operating telephone and can perform the dual function of a flashlight and an illuminated cosmetic mirror.

In one embodiment, the simulated telephone flashlight of this invention takes the form of a telephone handset with a battery mounted within the handset, an appropriate flashlight bulb mounted within the handset, and a suitable reflector to direct light from the bulb through either the earpiece or the mouthpiece of the handset, as desired. To selectively energize the bulb the handset has a switch at a convenient location for operation by the user when the handset is grasped in the usual manner. In this embodiment a dummy cord can extend from the mouthpiece end of the handset and is connected to a simulated telephone receiver hanger unit which is adapted to be mounted for example, on the dashboard of an automobile. A mirror can be mounted in that one of the earpiece, and mouthpiece which is not occupied by the lamp bulb. The mirror and bulb are so arranged that the area illuminated by the bulb is visible in the mirror when the handset is held at a distance from the user not greater than arms length.

In a variation of the first embodiment, a supplemental switch can be provided which cooperates with the hanger in such a manner that the bulb remains unenergized so long as the simulated telephone flashlight remains in its hanger, and the bulb is turned off automatically when the flashlight is placed in the hanger so there is absolutely no chance that the flashlight can inadvertently be left on after it is used. This switch overrides the manual switch of the handset. This first embodiment can be used in an automobile, or elsewhere, for example, in the bedroom or hallway of a home.

In a second embodiment, the handset again has the flashlight bulb positioned in either the earpiece or the mouthpiece. A mirror can be positioned in that one of the earpiece and mouthpiece not occupied by the lamp bulb. The battery, however, is eliminated and the simulated talking wire cord contains electrical conductors connected to a plug which can be plugged into the cigarette lighter of the automobile. This arrangement advantageously includes a manual switch to turn the light on and off, and in addition, can include the safety switch which automatically deenergizes the flashlight bulb when the handset is returned to its hanger.

Advantageously, both the handset and its hanger are formed from a suitable molded material such as polyethylene, polystyrene, or the like, which provides the advantage of electrical insulating characteristics which simplify the manufacture of the unit.

In that embodiment where the battery is self contained within the handset, the simulated coiled cord of the telephone is connected to the handset by a snap-in type removable connector which permits disconnecting the cord so the flashlight can be used at a location remote from its holder or hanger. The tether provided by the coiled cord provides the additional advantage that the flashlight cannot be misplaced in the vehicle since the cord will normally not be unsnapped. The hanger can be mounted at a convenient location in the automobile such as on the dashboard where the flashlight can be easily reached for use.

Correspondingly, an object of this invention is to provide a flashlight in the form of a simulated telephone which has the features and advantages discussed and set forth herein. Numerous other objects, features and advantages of this simulated telephone type flashlight will become apparent with reference to the drawings which form a part of this specification and illustrate preferred embodiments of the invention.

DETAILED DESCRIPTION OF THE INVENTION

Figure 1:
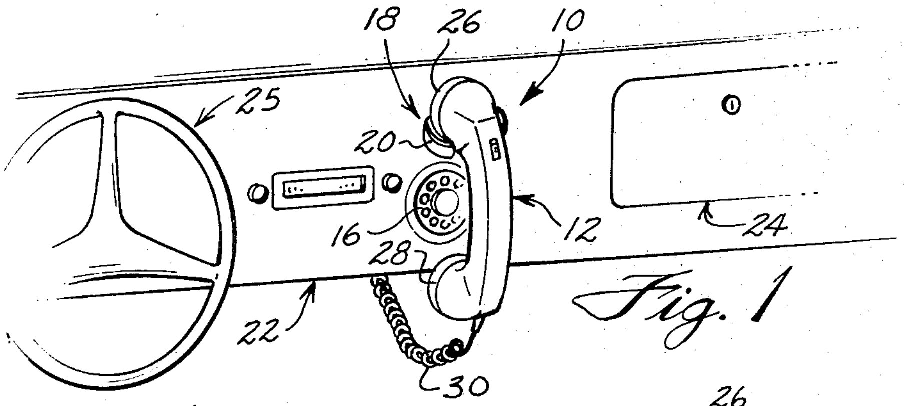
FIG. 1 is a pictorial view of the simulated telephone flashlight of this invention showing the flashlight and its holder on the dashboard of an automobile.

Referring now to the drawings in detail and particularly to FIG. 1 there is shown a simulated telephone flashlight 10 according to this invention. The flashlight includes a simulated telephone handset 12 and a simulated receiver 14 that can be provided with a simulated dial 16 so the telephone flashlight assembly 10 provides the appearance of an actual working telephone. At one side of receiver 14 is a hanger 18 having a U-shaped support 20 on which the simulated handset 12 can be hung when the flashlight is not in use. The receiver 14 is adapted to be mounted on the dashboard 22 of an automobile, at some location convenient to and within the reach of the driver, for example, at a location between glove box 24 and steering wheel 25.

To make the flashlight realistic in its simulation of a telephone, the handset 12 has the appearance of a real telephone handset including an earpiece 26 at one end and a mouthpiece 28 at the other end. Connected to the handset 12 adjacent its lower end, at the usual point of connection of the telephone cord is a simulated cord 30, which can be coiled and can take different forms, in accordance with the invention, as will subsequently be described with regard to the embodiments of FIGS. 2 and 3.

Figure 2:
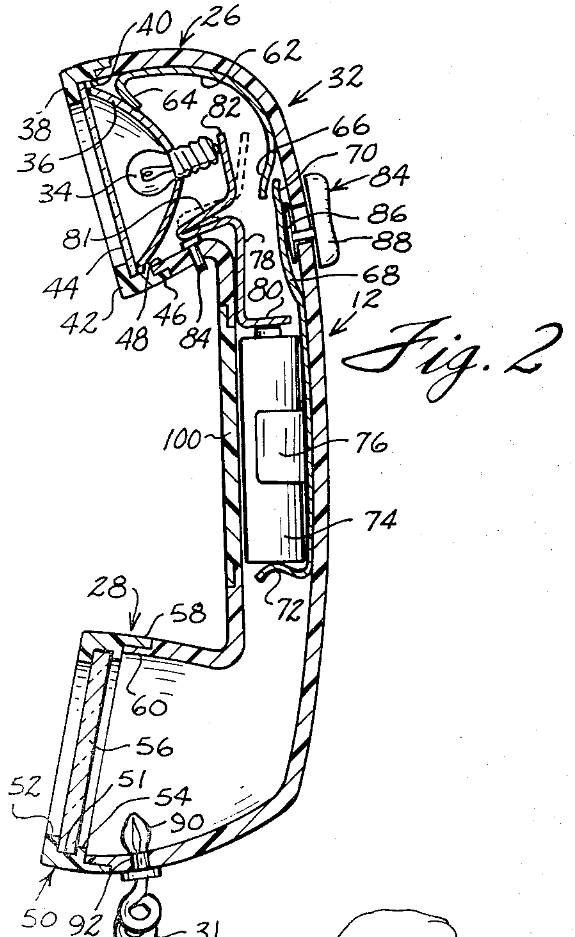
FIG. 2 is an enlarged view in section showing the details of a first embodiment of the simulated telephone flashlight.

With reference to FIG. 2, there is shown a first embodiment of the handset 12 of the simulated flashlight of this invention. Handset 12 has a molded body 32 shaped like an actual telephone handset with an earpiece portion 26, and a mouthpiece portion 28 at the respective ends of the handgrip 29. Body 32 is of molded construction and takes the form of a thin walled shell.

Mounted in earpiece portion 26 is a lamp 34 which can be a screw fit in metal reflector 36 which supports the lamp bulb 34. Reflector 36 is retained by a mouthpiece cap ring 38 which has several spaced apart projections spaced from a flange 40 to retain reflector 36 and a transparent lens 44 within the cap. Cap 38 has a ring shaped end 46 adapted to fit over a cooperating ring shaped portion 48 of housing 32 where it is frictionally secured, or alternatively, can be cemented to the housing.

Mouthpiece 28 includes a cap ring 50 having a recess 51 defined by a ring like flange 52 and plural projections 54. Projections 54 are spaced from flange 52 by a distance to receive a plastic or glass mirror 56. The cap has a ring like flange 58 which slips over a mating flange 60 at the mouthpiece end of the receiver housing.

Secured to the inside of housing 32 adjacent earpiece 26 is an electrically conductive metal strip 62 having an end 64 which engages and electrically connects strip 62 to reflector 36. The end 66 of the strip is spaced from the receiver housing. A second electrically conductive strip 68 has its tip 70 disposed between the receiver housing and tip 66 of conductor 62. A substantial portion of strip 68 is spaced from the wall of the housing and has spring characteristics. Strip 68 extends a substantial length along the inside of the housing and terminates at a contact end 72 adapted to engage one terminal of a battery 74 mounted within the housing and retained in the housing by a U-shaped spring clip 76.

A conductor 78 has a tip 80 which contacts the other terminal of battery 74. Conductor 78 is made of metal with spring characteristics and has a U-shaped bend 81 adjacent its contact tip 82 which normally contacts the end terminal of bulb 34 when the flashlight is in use. Disposed between the portion 81 having the bend and the wall of earpiece portion 26 is a plunger 84 of insulating material which extends through the side of the housing and projects downwardly with its tip exposed. When the handset 12 is hung on hanger 18 the hanger engages the tip of plunger 84 thereby moving contact tip 82 to its dotted line position where it is out of engagement with the end of bulb 34. This provides for automatically deenergizing bulb 34 whenever the simulated telephone handset 12 is placed on its hanger, regardless of the position of cam 86 of slide switch 84, which causes tip 70 of conductor 68 to engage tip 66 of conductor 62 when switch knob 88 is advanced (upwardly as shown at FIG. 2) to complete the circuit between the battery and the lamp bulb.

In the embodiment of FIG. 2 cord 31 is a simulated cord, is preferably coiled and resilient and acts as a tether. This cord is preferably secured at one end to the receiver 14 and as shown in FIG. 2, is releasably connected to the handset adjacent the mouthpiece portion by a snap connector 90 which is a snap fit in opening 92 in the bottom of housing 32. This provides for releasing the handset 12 from its tether cord 31 so the flashlight can be used outside the vehicle if desired, or in case of an emergency.

Figure 4:
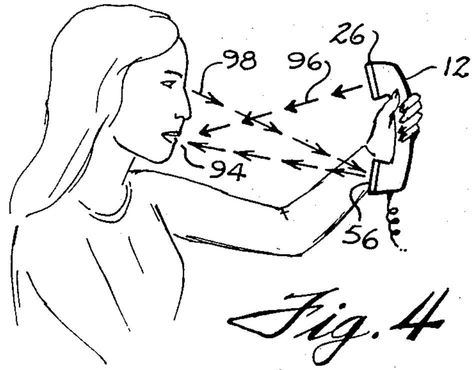
FIG. 4 is a diagrammatic view showing the telephone flashlight in use as a cosmetic applying light mirror.

As shown at FIG. 4, when handset 12 is held in the hand of the user, with lamp 34 energized, and at a distance from the face of the user not exceeding arms length, the light beam 96 from bulb 34 in simulated earpiece 26 can be directed toward a portion of the face of the user for example, the lips 94, while mirror 56 is so oriented that the lips 94 illuminated by light beam 96 can be seen by looking in mirror 56 along the line of sight 98 shown in dot dash lines. This relationship exists because the axis of light beam 96 intersects the axis of mirror 56 at a finite distance from the handset. Mirror 56 slopes toward reflector 36 so the axes intersect. Hence, the simulated telephone flashlight can be used as an aid to applying cosmetics such as lipstick to the face of the user.

Replacing the battery 74 in the embodiment of FIG. 2 is simply accomplished merely by removing the snap-in trap door 100 from the inside of the handgrip portion of the handset whereupon the battery is exposed for removal and replacement.

Figure 3:
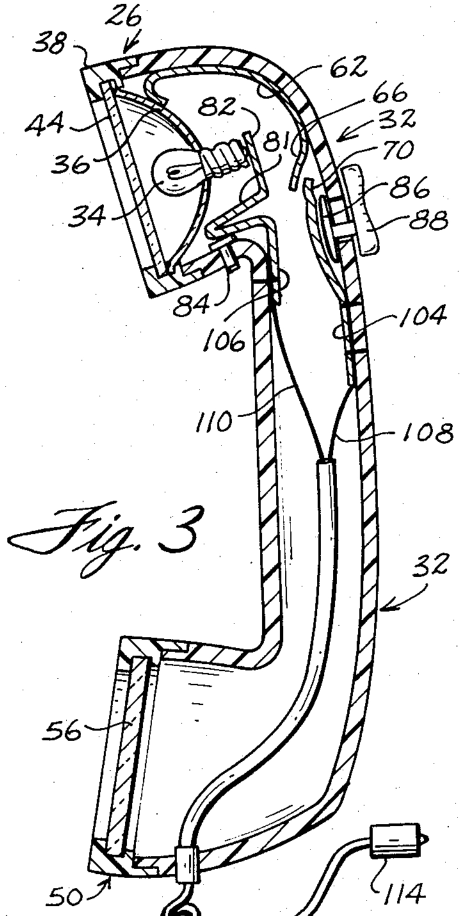
FIG. 3 is a view corresponding to FIG. 2 and showing a second embodiment of the simulated telephone flashlight.

FIG. 3 shows a second embodiment of the simulated telephone flashlight of this invention. The embodiment of FIG. 3 is quite similar to the embodiment of FIG. 2 and has an earpiece end cap 38 as well as a mouthpiece end cap 50 identical to that described for the embodiment of FIG. 2. An identical reflector 36, lamp bulb 34, and mirror 56 are mounted in the handset. The FIG. 3 embodiment includes a conductor 62 identical to that previously described as well as a switch knob 88 and switch operating cam 86.

In the embodiment of FIG. 3 there is a conductor 104 which has a tip portion 70 and a conductor 106 which has a U-shaped bend between the point of fastening to the housing and its contact tip 82 which engages the center terminal of lamp bulb 34. One end of conductor 104 is connected to wire 108 and one end of conductor 106 is connected to wire 110. The wires extend through housing 32 and exit as a coiled cord 112 which has a cigarette lighter plug 114 at its end. When plug 114 is inserted in the cigarette lighter receptacle of the automobile, electrical energy from the battery of the vehicle is connected to conductors 104 and 106. Correspondingly, when the handset is removed from its hanger 20 and switch knob 88 is pushed up, conductor tip 70 is cammed into engagement with conductor tip 66 and a circuit is completed to both terminals of lamp 34 thereby energizing the lamp and causing a light beam to emanate from the earpiece 26.

The embodiment of FIG. 3 also has the protective feature that lamp bulb 34 will be unenergized while the receiver is in its hanger 20. This is again accomplished by plunger 84, which, in response to the weight of the handset, flexes the conductor 106 so its tip 82 is out of contact with the center terminal of lamp bulb 34. As previously explained, this prevents accidentally leaving the lamp energized after it has been used. In the embodiment of FIG. 3, the switch actuated by plunger 84 prevents accidental discharge of the vehicle battery when the flashlight is in its hanger even if switch knob 88 is inadvertently left in its on position.

Electrical cord 112 can be of any desired length, and can be sufficiently long to permit use of the flashlight as an emergency light outside but adjacent to the vehicle.

The location of switch knob 88 on the rear of the handset adjacent the mouthpiece end is quite convenient for manipulation by the thumb of the user when the handset is grasped.

While several preferred embodiments of the simulated telephone flashlight of this invention have been shown and described, it is to be understood that numerous changes can be made without departing from the scope of this invention as mentioned herein and as set forth in the appended claims.

What is claimed is:

1. A novelty flashlight simulating a telephone and comprising, in combination;
- a telephone handset including
  - a handgrip portion,
  - a simulated telephone mouthpiece at one end of the handgrip, and
  - a simulated telephone earpiece at the other end of the handgrip;
- a lamp and reflector in one of said mouthpiece and earpiece and energizable to emit a beam of light in a direction transverse to the handgrip portion and through said one of said mouthpiece and earpiece;
- means for connecting a source of electrical energy to the handset;
- switch means for selectively energizing the lamp from the electrical energy source; and
- a mirror in the other of said mouthpiece and earpiece, the mirror and lamp being so oriented that a person holding the handset with the light beam from the lamp directed toward a part of his face can see the illuminated part of his face by looking in the mirror.

2. A flashlight according to claim 1 wherein
- the handset comprises
  - a hollow casing;
- said means for connecting a source of electrical energy to the handset includes
  - connector means for connecting the lamp to a battery;
- said switch means includes
  - a switch electrically connected between the lamp and battery; and
- mounting means mounting the switch on the handset for selective manual manipulation.

3. A flashlight according to claim 2 wherein
- said connector means is within the handgrip portion of the casing and includes
  - a retainer for retaining a battery within the casing;
- said handgrip portion having an access opening for access to the battery to permit removing and replacing the battery; and
- a closure for closing the access opening.

4. A flashlight according to claim 2 wherein
- said mounting means mounts the switch adjacent one end of the handgrip on the side thereof which faces away from the mouthpiece and earpiece.

5. A flashlight according to claim 1 which further includes
- a simulated telephone receiver;
- means on the receiver for supporting said handset; and
- a cord for retaining said handset in tethered relation to the receiver.

6. A flashlight according to claim 1 wherein
- a cord simulating a telephone handset wire extends from the handset;
- means for selectively and releasably connecting one end of the cord to the handset; and
- means for connecting the other end of the cord to a support to tether the flashlight.

7. A novelty flashlight simulating a telephone and comprising, in combination;
- a telephone handset including
  - a handgrip portion,
  - a simulated telephone mouthpiece at one end of the handgrip, and
  - a simulated telephone earpiece at the other end of the handgrip;
- a lamp and reflector in one of said mouthpiece and earpiece and energizable to emit a beam of light in a direction transverse to the handgrip portion and through said one of said mouthpiece and earpiece;
- means for connecting a source of electrical energy to the handset;
- switch means for selectively energizing the lamp from the electrical energy source;
- a cord simulating a telephone handset wire extending from the handset;
- connecting means for connecting one end of the cord to the handset;
- connecting means for connecting the other end of the cord to a support to tether the flashlight;
- one of said connecting means including a selectively readily releasable connection;
- a hanger mounted on the support; and
- switch means associated with one of said handset and support hanger for overriding said first mentioned switch means to prevent energizing the lamp when ever the handset is on the hanger.

8. A flashlight according to claim 7 wherein the readily releasable connection is the connecting means for connecting one end of the cord to the handset.

9. A novelty flashlight simulating a telephone and comprising, in combination;
- a telephone handset comprising
  - a hollow casing including a handgrip portion,
  - a simulated telephone mouthpiece at one end of the handgrip, and
  - a simulated telephone earpiece at the other end of the handgrip;
- a lamp and reflector in one of said mouthpiece and earpiece and energizable to emit a beam of light in a direction transverse to the handgrip portion and through said one of said mouthpiece and earpiece;

means for retaining a battery within the casing;

connector means within the casing for electrically connecting the lamp to the battery;

first switch means for manually selectively energizing the lamp from the battery;

hanger means for supporting the handset, when not in use as a flashlight; and second switch means on said handset and operated in response to placing the handset on the hanger means, for overriding said first switch means to prevent energizing the lamp whenever the handset is on the hanger means.

* * * * *